United States Patent
Smith et al.

(10) Patent No.: US 8,083,461 B2
(45) Date of Patent: Dec. 27, 2011

(54) BOOM WITH GUARD

(75) Inventors: Kent D. Smith, Mapleton, IL (US); Valerii V. Zinoviev, Moscow (RU)

(73) Assignee: Caterpillar Inc., Peoria, IL (US)

( * ) Notice: Subject to any disclaimer, the term of this patent is extended or adjusted under 35 U.S.C. 154(b) by 346 days.

(21) Appl. No.: 12/206,138

(22) Filed: Sep. 8, 2008

(65) Prior Publication Data

US 2010/0061808 A1 Mar. 11, 2010

(51) Int. Cl.
*B66F 11/00* (2006.01)

(52) U.S. Cl. .............. 414/745.6; 212/177; 212/347

(58) Field of Classification Search .......... 114/371–374, 114/139–140, 219; 212/255, 258, 260–261, 212/347, 175; 405/184.4, 212, 215; 414/138.2, 414/680, 722, 732, 739, 745.4–745.6, 690, 414/731; 52/717.03, 717.05, 718.01; 74/608, 74/612; 267/139–140; 293/114, 123; 409/134
See application file for complete search history.

(56) References Cited

U.S. PATENT DOCUMENTS

| | | | | |
|---|---|---|---|---|
| 718,897 A * | 1/1903 | Arsneau | ................. | 254/399 |
| 2,626,715 A * | 1/1953 | Sparks et al. | ................. | 212/347 |
| 2,712,873 A * | 7/1955 | Peterson | ................. | 212/258 |
| 3,171,660 A * | 3/1965 | Fisher et al. | ................. | 277/356 |
| 3,618,693 A * | 11/1971 | Graham | ................. | 180/276 |
| RE27,318 E * | 3/1972 | Gensheimer | ................. | 405/215 |
| 3,653,517 A * | 4/1972 | Grasby | ................. | 212/175 |
| 3,677,017 A * | 7/1972 | Shirvany | ................. | 405/215 |
| 3,902,735 A | 9/1975 | Bertram et al. | | |
| 4,003,475 A | 1/1977 | Brolin | | |
| 4,966,290 A | 10/1990 | Ejchler et al. | | |
| 5,655,676 A | 8/1997 | Kairis | | |
| 2004/0135385 A1 * | 7/2004 | Murray et al. | ................. | 293/142 |
| 2006/0231992 A1 * | 10/2006 | Iannarelli et al. | ................. | 267/140 |

* cited by examiner

*Primary Examiner* — Gregory Adams

(74) *Attorney, Agent, or Firm* — Miller, Matthias & Hull

(57) ABSTRACT

A boom configured to maneuver large objects, such as sections of pipe, which comprises a machine guard assembly having a support member. The support member includes an outer support surface with a protective layer disposed thereon.

20 Claims, 8 Drawing Sheets

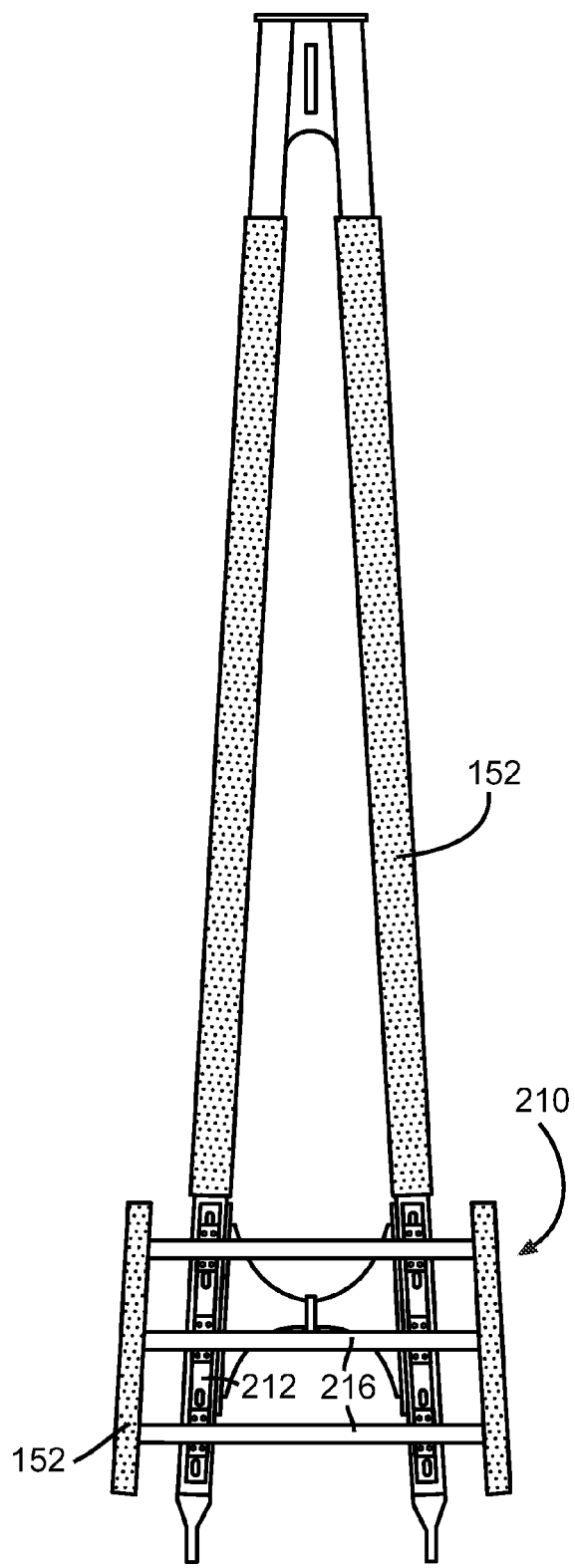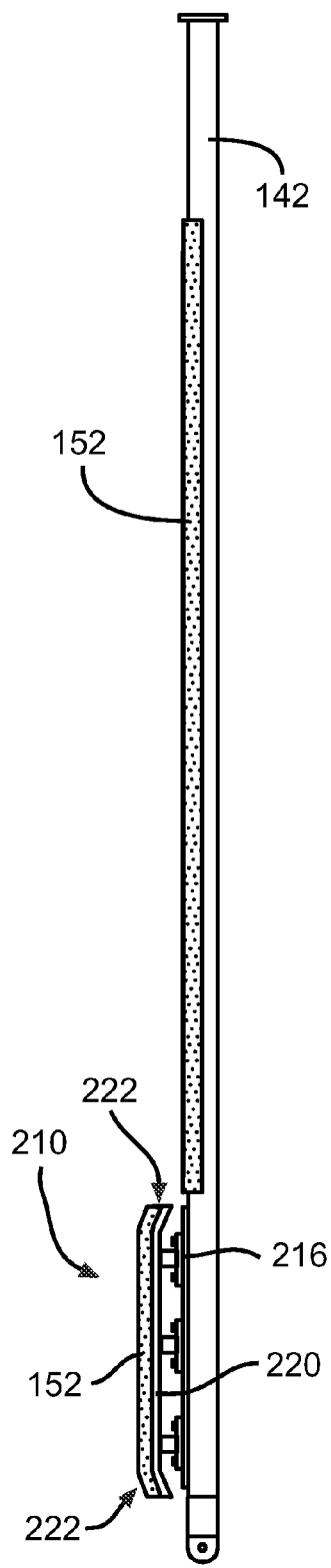

BOOM WITH GUARD

TECHNICAL FIELD

The present invention relates generally to boom protection structures and systems and, more particularly, to machines such as pipelayers that have booms with such protective structures.

BACKGROUND

Construction machines that manipulate large diameter pipes, typically for construction of pipelines, are a specialized type of machines, and are generally referred to as "pipelayers." Pipelayers are equipped with specialized tools and frames for supporting and manipulating the large, heavy pipe sections. Such tools and frames generally include a pipelayer frame assembly for supporting a pipe-supporting boom arm, a counterweight assembly, and a device for maneuvering the boom arm, such as a drawworks, winch assembly, or a hydraulic fluid cylinder connected to the pipelayer frame and the boom arm.

As requirements for more robust pipe systems have increased, the importance of the pipe's structural integrity has similarly increased. Further, the exterior of the pipe may have a coating composition applied to its exterior, which may be prone to chipping, cracking, or delamination and separation from the underlying pipe substrate if the pipe abruptly strikes the boom's outer support surface. Furthermore, the pipe itself is prone to chipping, cracking, microfractures, dents, and other defects induced by striking rigid objects, such as the boom. Boom pads or other materials are often used to reduce the force of impact between the pipe and the boom's outer support surface, but such boom pads are strapped or otherwise temporarily attached to the boom and routinely shift during machine use, resulting in an exposed area of the boom's outer support surface.

Further, in some applications, a pipelayer may be employed to transport sections of pipe while the pipe section is suspended by the pipelayer boom. When a pipelayer is used to transport the pipe sections, the boom may be placed in the most upright position so the pipe section rests against an outer surface of the boom arms. However, when the pipe section rests against the boom arms, it may become displaced from the resting point along the boom arms as the machine traverses rough terrain, which may cause damage to the pipe section by, e.g., abruptly striking or scraping against a boom arm. As such, the pipe or any applied coating may be damaged during transportation.

U.S. Pat. No. 4,966,290 ('290) issued to Ejchler et al. discloses a vehicle for manipulating pipe that is configured for storage of a fluid cylinder used to raise and lower a boom arm on the vehicle during transportation. The '290 patent provides this without requiring disconnection of fluid lines. However, the '290 patent does not address the issue of stabilizing a pipe section against the boom during transportation of the pipe section.

SUMMARY OF THE INVENTION

In one aspect, the present disclosure is directed to a boom configured for maneuvering large objects, the boom comprising a first boom arm and a guard assembly connected to the first boom arm. The guard assembly includes a rigid first crossmember having a first end, wherein the first end extends laterally past the first boom arm; and a rigid first support member connected proximate to the first end of the first crossmember, wherein the first support member is laterally separated from the first boom arm, the first support member including a support surface having a protective layer thereon.

In another aspect, the present disclosure is directed to a machine, such as a pipelayer, configured to maneuver large objects, such as pipesections. The machine comprises a frame including a first boom arm connecting joint; a boom assembly having a first boom arm with distal and proximal ends wherein the proximal end of the boom arm is pivotally connected to the machine at the first boom arm connecting joint; and a guard assembly connected to the first boom arm. The guard assembly includes a first crossmember having a first end, wherein the first end extends laterally past the first boom arm; and a first support member joined proximate to the first end of the first crossmember, wherein the first support member is separated from the first boom arm, the first support member including a support surface with a protective layer.

BRIEF DESCRIPTION OF THE DRAWINGS

FIG. 7 is an illustration of the boom having a guard assembly with three crossmembers and an integral protection layer.

FIG. 8 is an illustration of a profile perspective of the boom having a guard assembly with three crossmembers and an integral protection layer.

DETAILED DESCRIPTION

The present disclosure is directed to machines having a boom that is configured to assist in supporting a large object or item being transported by movement of the machine via driving members, the boom having a protective pipelayer guard structure (referred to hereafter as a "pipelayer guard assembly" or just "guard assembly") that is designed to extend beyond the boom span to increase the stability of the object during transport. For purposes of example only, the machine described herein is a pipelayer, although other machines such as excavators, cranes, and various forestry machines that have been modified to transport pipe sections are within the scope of the invention.

Figure 1:
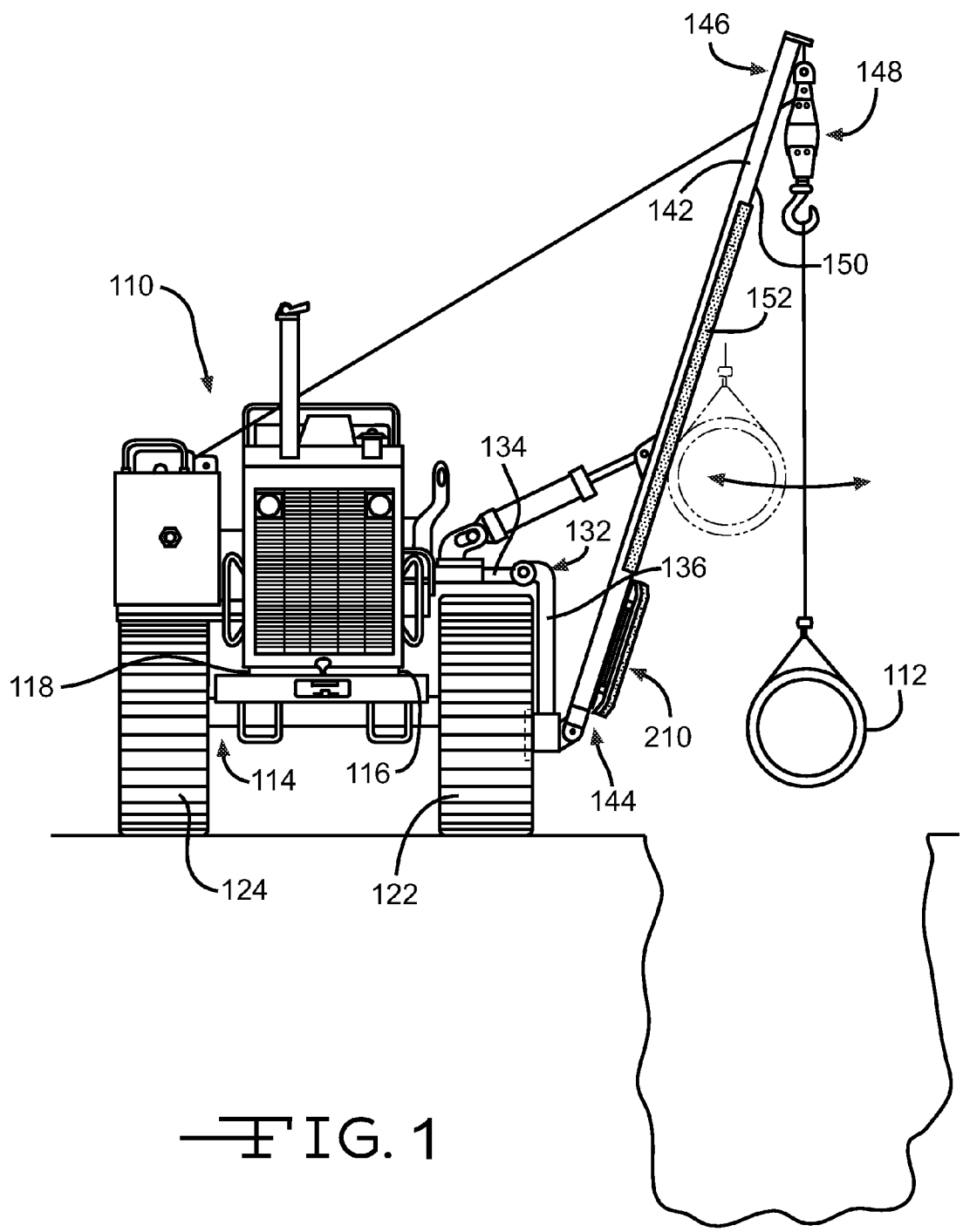
FIG. 1 is an illustration of a pipelayer holding a pipe section, with the shadow portion illustrating possible movement of the pipe section against the boom arm during maneuvering.

Regarding FIG. 1, pipelayer 110 is a self-laying track-type machine designed to maneuver large diameter pipe sections 112, the pipelayer having a main frame assembly 114 having first and second opposed sides 116 and 118, first and second endless self-laying track assemblies 122 and 124 with each assembly being connected to a respective side of the frame assembly and with each track assembly having a roller frame, one of which is shown as roller frame 126. The machine further includes a second frame 132, also called a pipelayer frame, which has a first portion 134 secured to the main frame assembly 114 and a second portion 136 secured to one of the roller frames 126 by a plurality of fasteners 138.

Figure 1A:
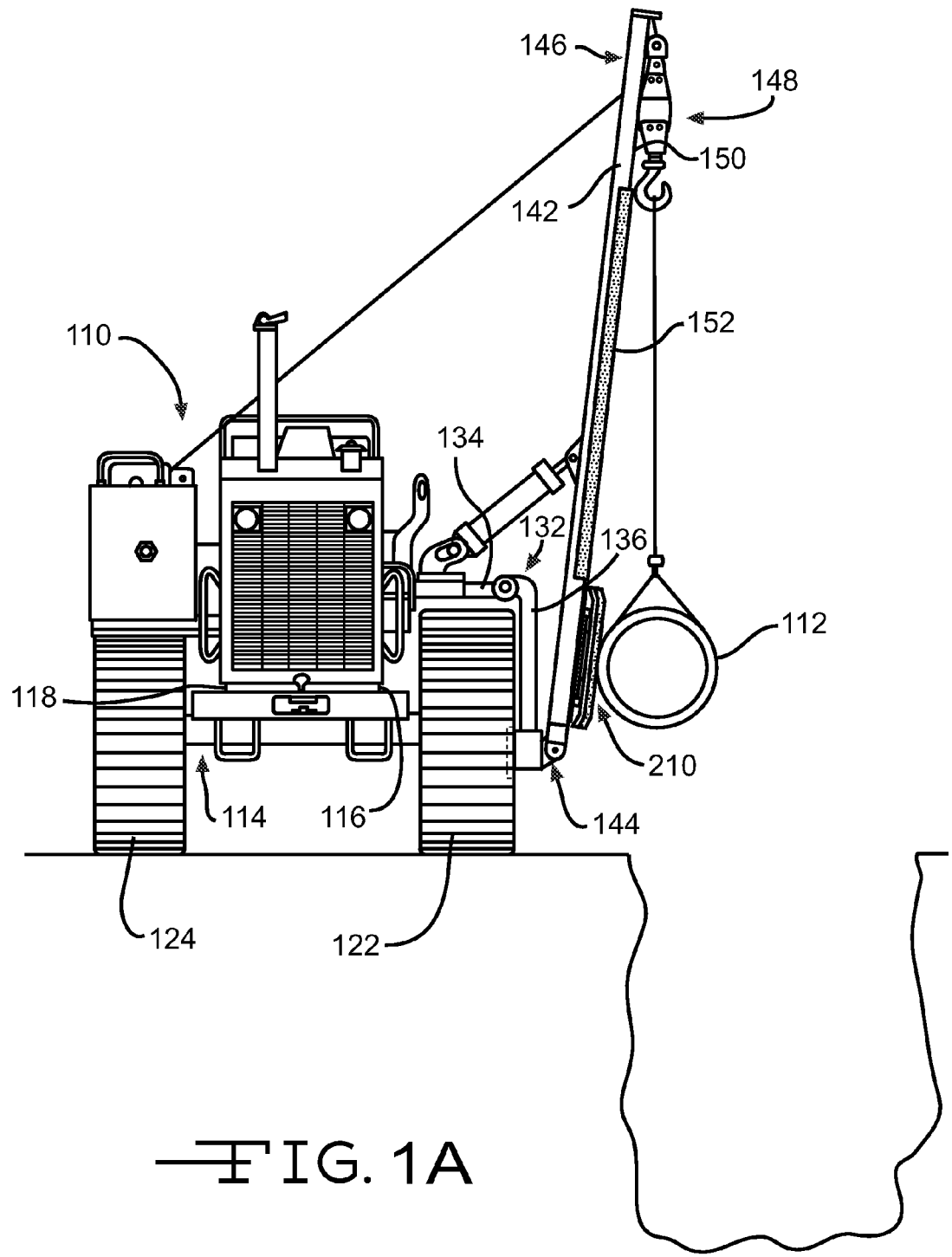
FIG. 1A is an illustration of a pipelayer holding a pipe section, with the boom assembly raised to its upper position such that the pipe section rests against the boom arm.
Figure 2:
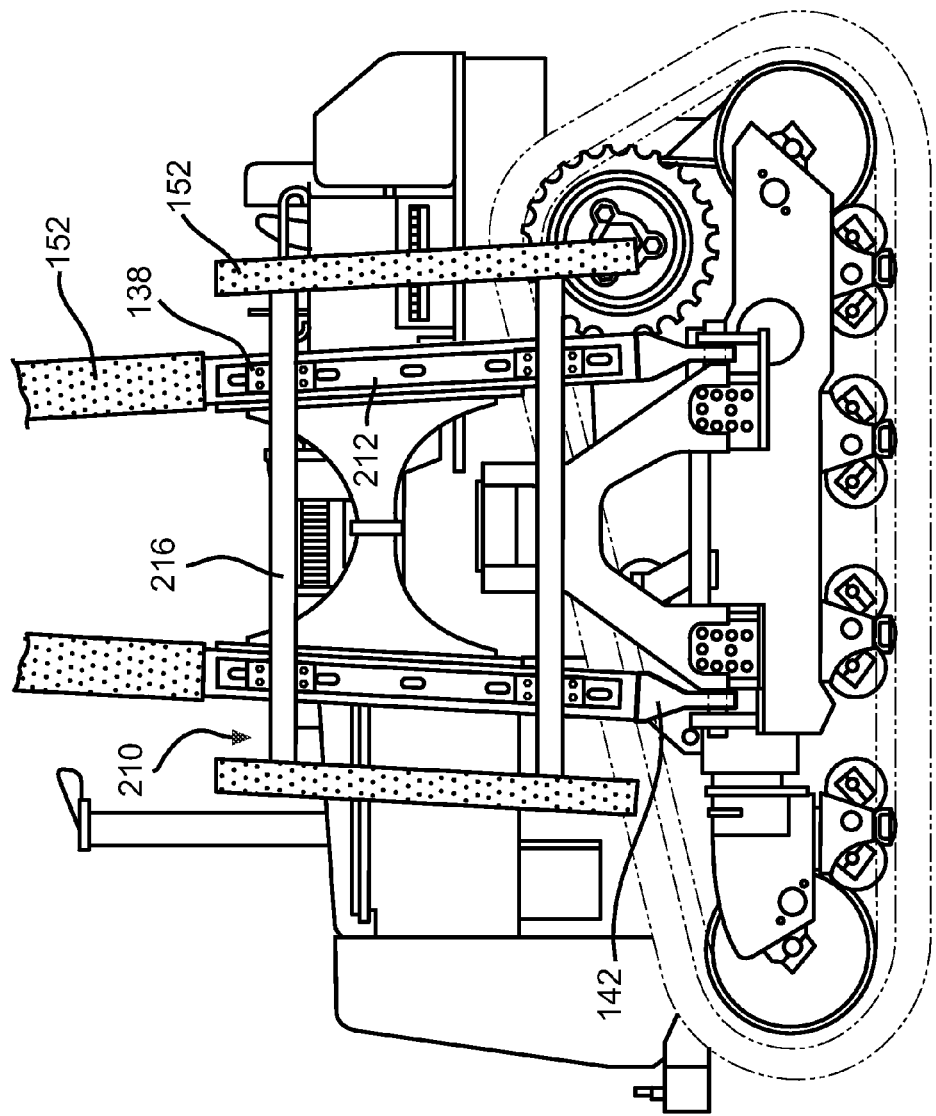
FIG. 2 is an illustration of a profile perspective of the pipelayer with the boom having a guard assembly.
Figure 3:
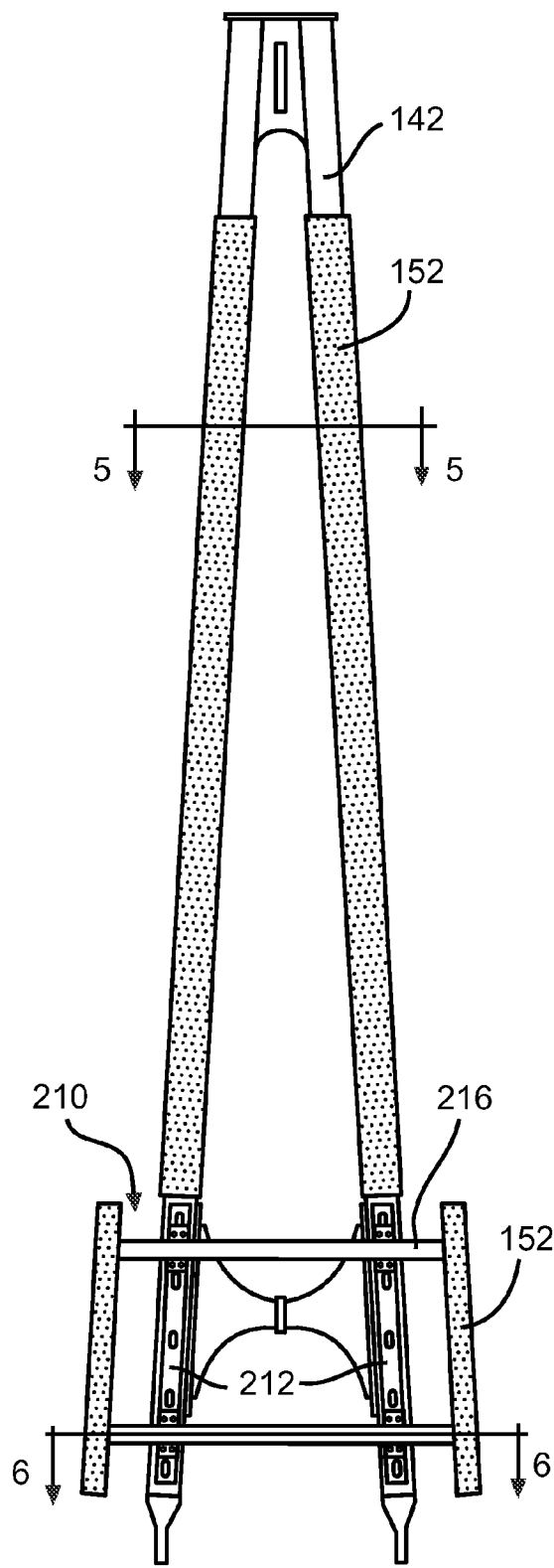
FIG. 3 is an illustration of the boom having a guard assembly and an integral protection layer.
Figure 4:
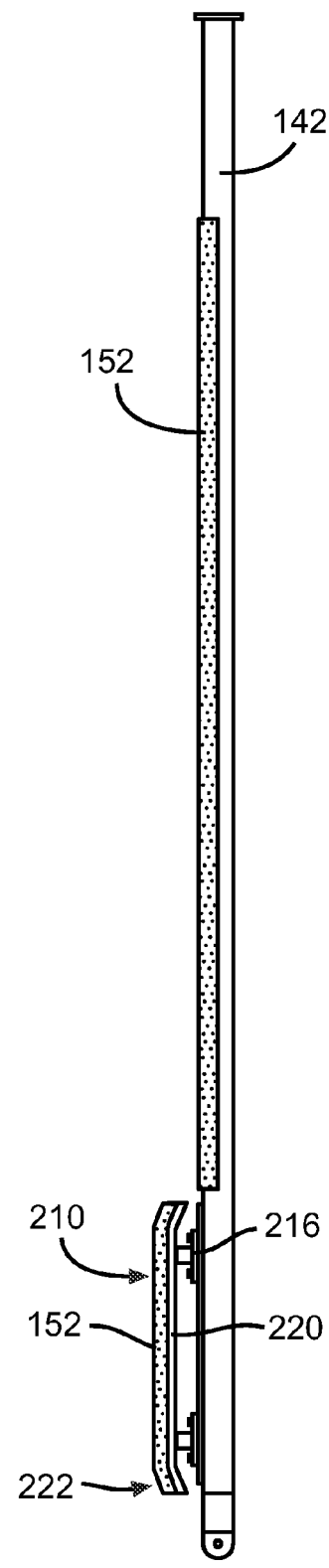
FIG. 4 is an illustration of a profile perspective of the boom having a guard assembly and an integral protection layer.
Figure 5:
FIG. 5 is a cross-sectional view of the boom with the support surface of the boom arms having the integral protective layer, taken generally along lines 5-5 of FIG. 3.
Figure 6:
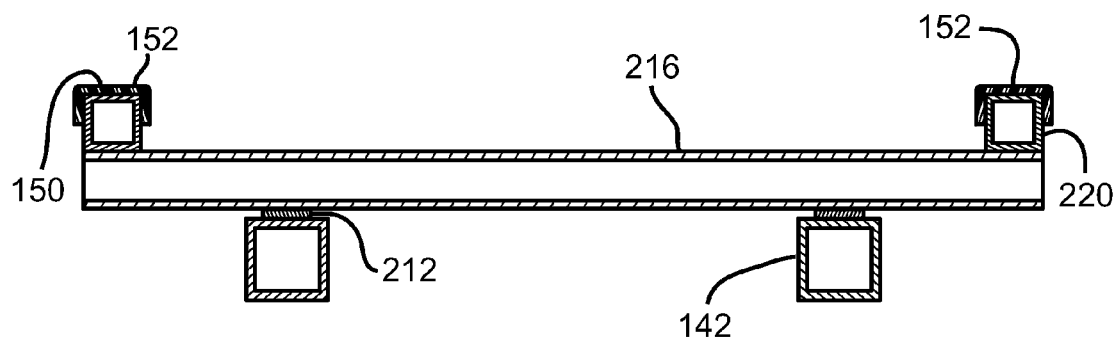
FIG. 6 is a cross-sectional view of the boom with the guard assembly and support surface of the boom arms having the integral protective layer, taken generally along lines 6-6 of FIG. 3.

Pipelayer 110 further comprises a boom assembly that comprises at least one boom arm 142 having a proximal end 144 pivotally connected to the pipelayer frame's second portion 136 at a boom arm connecting joint, and a distal end 146 supporting a load block assembly 148. Boom arm 142 further comprises a pipelayer guard assembly 210 that both supports pipe section 112 during transport and protects the pipelayer from inadvertent contact with pipe section 112. Pipelayer guard assembly 210 comprises a crossmember 216 and a pipe support member 220, with pipe support member having a support surface 150, against which pipe section 112 may rest when the boom is raised into its upright position, as seen in FIG. 1A.

Figure 9:
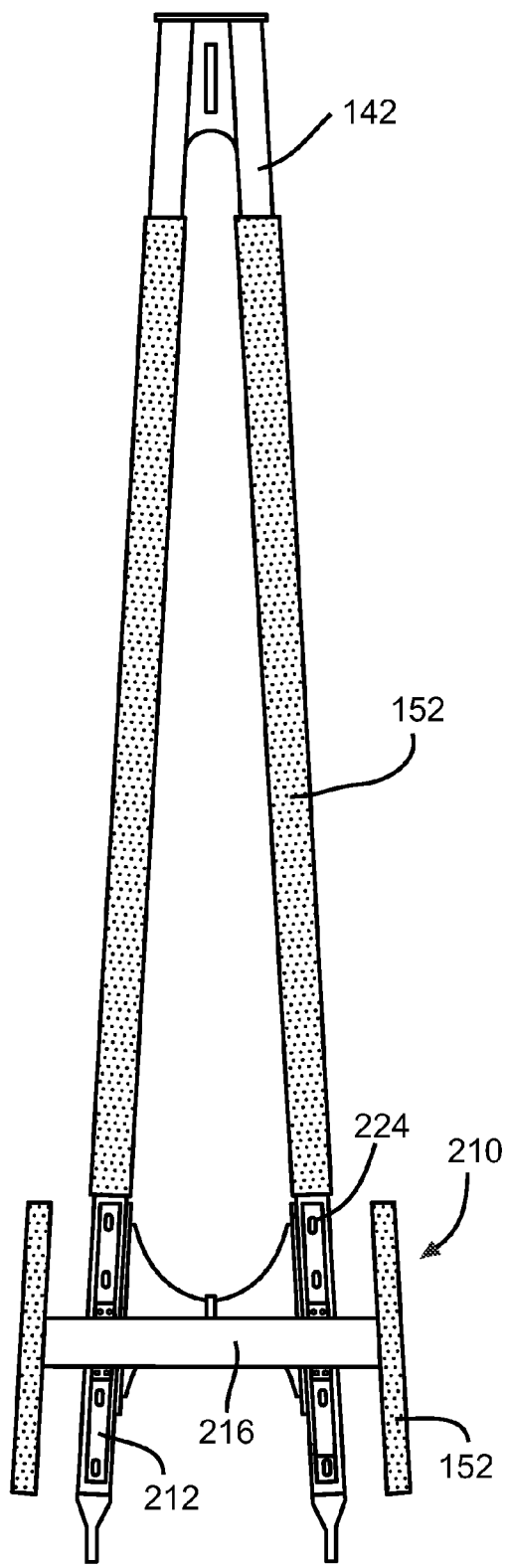
FIG. 9 is an illustration of the boom having a guard assembly with one crossmember and an integral protection layer.
Figure 10:
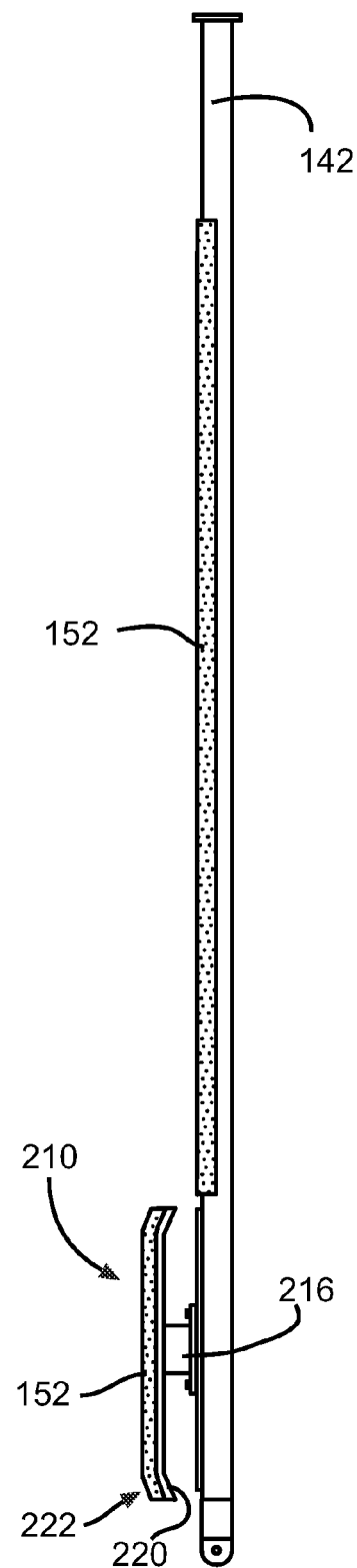
FIG. 10 is an illustration of a profile perspective of the boom having a guard assembly with one crossmember and an integral protection layer.

Pipelayer guard assembly 210 comprises at least one, and often two or more, crossmembers 216, which are designed to support the pipe support member 220 at a distance outside of the boom span sufficient to stabilize pipe section 112 during transportation, as seen in various views in FIGS. 2-13. As used herein, "boom span" may refer to the distance between the outermost boom arms if the pipelayer comprises two or more boom arms at the pivotally connected proximal end of the boom arms. Alternatively, "boom span" may refer to the width of the outer surface of the boom arm at its widest part, typically the pivotally connected proximal end of the boom arm, if the pipelayer comprises only one boom arm, as shown in FIG. 9.

Figure 11:
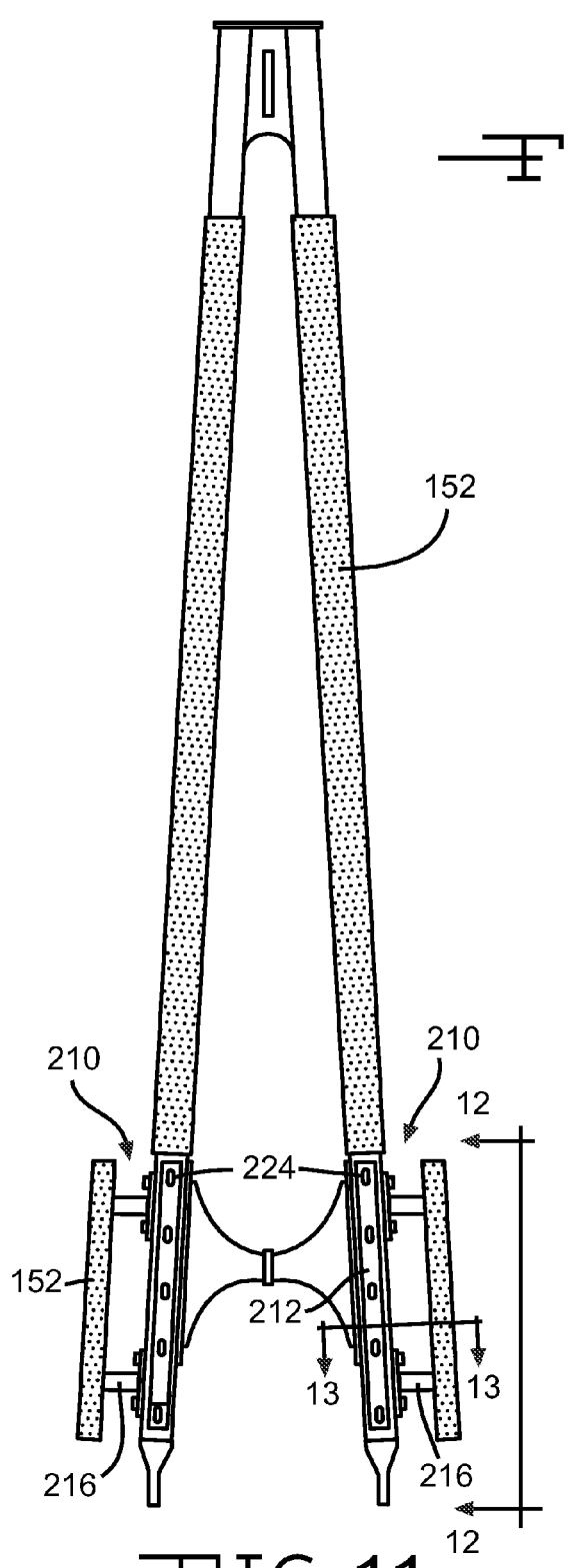
FIG. 11 is an illustration of the boom having a guard assembly with crossmembers extending from the boom arms, but not bridging the boom span.
Figure 12:
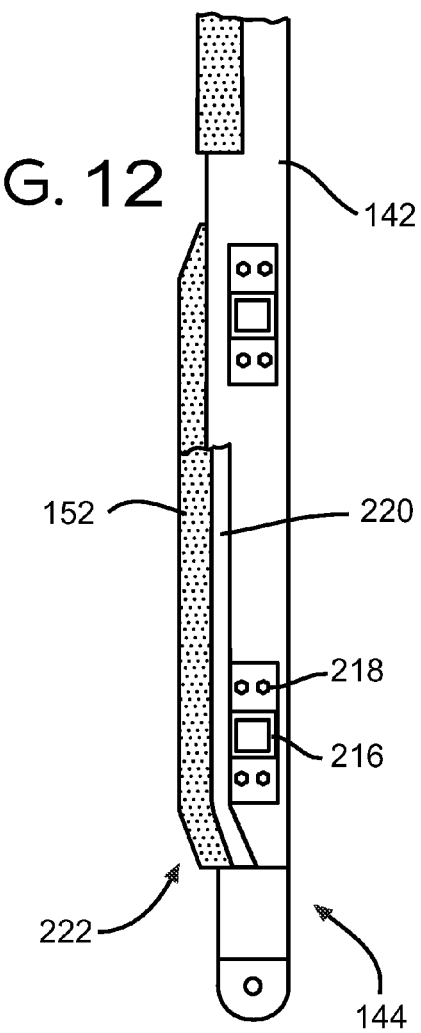
FIG. 12 is an illustration of a profile perspective of the boom having a guard assembly with crossmembers extending from the boom arms, but not bridging the boom span.
Figure 13:
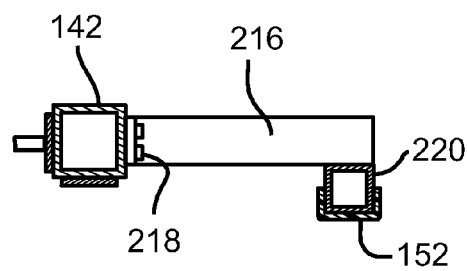
FIG. 13 is a cross-sectional view of the boom with the guard assembly having crossmembers extending from the boom arms, but not bridging the boom span, taken generally along lines 13-13 of FIG. 11.

Crossmember 216 may bridge the boom span when two or more boom arms are present, as seen in FIGS. 2-10, or they may be individually attached to the separate boom arms and extend outward from the boom span, as shown in FIGS. 11-13. Crossmember 216 extends laterally along the machine such that, in profile, crossmember 216 extends toward the front and/or rear of the machine. While crossmember 216 may extend laterally along the machine in a substantially horizontal orientation, alternative configurations comprise crossmembers that are not horizontal. Regardless of the configuration, crossmember 216 extends laterally along the machine a sufficient distance such that the total horizontal displacement from the boom arm is sufficient to stabilize pipe section 112. In one embodiment, crossmember 216 extends laterally along the machine a sufficient distance or length such that the total horizontal displacement of a distal end of the crossmember from the boom arm is at least about 10 cm, such as between about 10 cm and about 3 m, between about 20 cm and about 1.5 m, between about 25 cm and about 1 m, or between about 30 cm and about 75 cm. For example, crossmember 216 may extend laterally along the boom arm from about 35 cm to about 50 cm.

Moreover, a third crossmember may be employed, as shown in FIGS. 7-8, contributing additional structural rigidity to the pipelayer guard assembly. Further, while crossmember 216 may be oriented such that it is substantially parallel to the side of the machine as it extends toward the front and/or rear of the machine, it may also bend or slope inwardly toward or outwardly from the machine Pipelayer 110 further comprises at least one pipe support member 220 to stabilize and protect pipe section 112 and any coating thereon during transport and to protect pipelayer 110 from damage possibly incurred if the pipe section were to strike pipelayer 110 during transport. In one embodiment, pipelayer 110 comprises two pipe support members 220 fixedly attached to crossmember 216. Alternatively, crossmember 216 may have a pipe support member that is not connected to any other crossmember. In one embodiment, pipe support member 220 is oriented in a substantially vertical fashion, such as, e.g., substantially parallel to the nearest boom arm. However, in other embodiments, pipe support member may be oriented differently, such as about 45°, about 35°, about 25°, about 15°, about 5° off of vertical, or any orientation therebetween.

Pipe support member 220 is long enough such that pipe section 112 is supported by pipe support member 220 rather than the boom arm. In one embodiment, pipe support member 220 is between about 1 m and about 3 m long, such as between about 1 m and about 2 m or between about 1 m and about 1.5 m long.

Pipe support member 220 is configured to minimize the potential damage pipe section 112 may incur when contacting pipe support member 220. To that end, pipe support member 220 may be substantially straight without variation over its length. In one embodiment, pipe support member 220 may have at least one sloping region 222. Sloping region 222 may be oriented at either end of pipe support member 220, or at both ends, with the sloping region designed to slope away from the support surface to reduce the possibility that pipe section 112 would strike an abrupt edge of pipe support member 220. Alternatively, or in conjunction, a sloping region may be oriented toward the middle of pipe support member 220, wherein the sloping region forms a type of concave feature in pipe support member 220.

Crossmember 216 and pipe support member 220 may comprise any suitable material. For example, crossmember 216 and pipe support member 220 may comprise an alloy, such as a steel alloy, a rigid or reinforced polymeric material, or composite material, such as a carbon fiber composite.

Crossmember 216 and pipe support member 220 may be joined to one another and pipelayer guard assembly may be joined to the boom or other pipelayer feature using any suitable joining means known in the art. For example, the joining means may include welding, brazing, or fasteners, such as bolts. Optionally, pipelayer guard assembly 210 may also comprise a base plate 212 to which the crossmember 216 may be fastened by crossmember fasteners 218. When present, base plate 212 reinforces and facilitates attachment of the crossmember 216 to the boom arm. That is, crossmember 216 may be joined to the base plate that is, in turn, joined to the boom arm. Base plate 212 itself may be joined to the boom arm using any suitable joining means known in the art, such as welding, brazing, or fasteners, such as bolts. In one embodiment, base plate 212 has at least one joining region 224, wherein material has been removed from the baseplate to facilitate joining of the baseplate to the boom arm, potentially at a lower stress area of the baseplate. As shown in FIGS. 9 and 11, joining region 224 of baseplate 212 may be used as a weld site.

Outer support surface 150 of pipe support member 220 may comprise a protective layer 152 that reduces the force of impact and rigid interaction between outer support surface 150 and pipe section 112 while raising the boom arm and as the machine transports pipe section 112. Protective layer 152 may be any known structure or material known in the art suitable for protecting the outer support surface 150 and any coating on the pipe section. Protective layer 152 comprises a material that elastically deforms under compressive force applied as pipe section 112 encounters outer support surface 150. Specifically, protective layer 152 should comprise a material that is capable of elastically deforming under compressive force by at least 5% of its thickness. For example, protective layer 152 elastically deforms in compression by at least 25%, at least 40%, at least 50%, at least 60%, or at least 70% of its thickness.

For example, protective layer 152 may comprise bumper pads integrally or temporarily attached to the pipe support member 220, the bumper pads being made of any suitable polymeric material, which may include dedicated padding or remnant of other structures, such as tire scraps. Further, protective layer 152 may be a polymeric layer integrally attached to pipe support member 220. Protective layer 150 may be applied strategically to those areas of outer support surface 150 that are most likely to encounter pipe sections 112, or protective layer 150 may be applied to substantially all of outer support surface 150. For example, protective layer 152 is applied to at least about 10% of the length of the outer support surface 150. With regard to width, protective layer 152 may be applied to only a portion of the width of outer support surface 150 of the boom arm, or it may be applied such that substantially the entire width of outer support surface 150 is covered. As shown in FIGS. 1-13, protective layer 152 may also be applied to a portion of a surface 210 adjacent to outer support surface 150 and, optionally, to a portion of the boom arm. In one embodiment, protective layer 152 is made of a foamed polymeric material.

When present, protective layer 152 has a thickness on outer support surface 150 sufficient to provide cushioning or dampening so that the force generated by movement of the pipe section into or along the boom arm does not fracture or remove any protective coating applied to the pipe section. Specifically, protective layer 152 is at least about $1.5 \times 10^{-3}$ m thick, while there is not necessarily a maximum thickness for the protective layer. For example, protective layer 152 may be between about $1.5 \times 10^{-3}$ m and about $1.0 \times 10^{-2}$ m thick.

If protective layer 152 is integrally present, it may be applied as a coating to the outer support surface 150 of the boom's support arm using any known technique for applying a polymeric material to a metallic substrate. For example, protective layer 152 may be applied to the boom arm via polymeric spraying techniques. Such application techniques may comprise a preparation step such as, e.g., mechanical roughening or chemical etching to create a surface that tends to promote adhesion between the polymeric material and the metallic substrate.

The pipelayer boom arms may also optionally comprise a protective layer similar or identical to protective layer 152, as shown in FIGS. 1-13.

INDUSTRIAL APPLICABILITY

The disclosed boom having a protective pipelayer guard assembly and the exemplary pipelaying machine are particularly useful for transporting pipe and, more specifically, for preserving the integrity of the pipe and any coating applied thereon. As a pipe section to be transported is lifted by the pipelayer, the pipe section comes to rest against the outer surface of the pipelayer guard assembly. According to the present disclosure, the pipelayer guard assembly supports the pipe section such that as the pipelayer moves, the pipe section is not prone to oscillation or erratic movement that could damage the pipelayer, the pipe, or any coating applied to the pipe, such movement being possibly induced as the pipelayer traverses rugged or even substantially level terrain.

Although the present disclosure has been described with reference to exemplary embodiments, one of ordinary skill in the art will recognize that changes may be made in form and detail without departing from the sprit and scope of the invention.

What is claimed is:

1. A machine configured to maneuver large objects, the machine comprising:
    a frame including a first boom arm connecting joint;
    a boom assembly having a first boom arm with distal and proximal ends wherein the proximal end of the boom arm is pivotally connected to the machine at the first boom arm connecting joint; and
    a guard assembly connected to the first boom arm, the guard assembly including:
        a first crossmember connected to the first boom arm and having a first end, wherein the first end extends laterally past the first boom arm; and
        a first support member joined proximate to the first end of the first crossmember and opposite the first crossmember from the first boom arm, the first support member including a support surface and at least one sloping region sloping away from the support surface toward the first boom arm,
        wherein the first support member is separated from the first boom arm by the first crossmember, the support surface including a protective layer.

2. The machine of claim 1, wherein the guard assembly includes a second crossmember having a first end, and wherein the second crossmember first end extends laterally past the first boom arm.

3. The machine of claim 1, wherein the first crossmember first end extends laterally past the first boom arm such that the total horizontal displacement of the first crossmember first end from the first boom arm is at least 10 cm.

4. The machine of claim 1, wherein the first crossmember first end extends laterally past the first boom arm such that the total horizontal displacement of the first crossmember first end from the first boom arm is between about 35 cm and about 50 cm.

5. The machine of claim 1, wherein the first support member is between about 1 m and about 3 m long.

6. The machine of claim 1, wherein the protective layer comprises a foamed polymeric material.

7. A boom configured for maneuvering large objects, the boom comprising:
    a first boom arm; and
    a guard assembly connected to the first boom arm, the guard assembly including:
        a rigid first crossmember connected to the first boom arm and having a first end, wherein the first end extends laterally past the first boom arm; and
        a rigid first support member connected proximate to the first end of the first crossmember and opposite the first crossmember from the first boom arm, the first support member including a support surface and at least one sloping region sloping away from the support surface toward the first boom arm, wherein the first support member is laterally separated from the first boom arm by the first crossmember, the support surface having a protective layer thereon.

8. The boom of claim 7, wherein the guard assembly includes a second crossmember having a first end, and wherein the second crossmember first end extends laterally past the first boom arm.

9. The boom of claim 7, wherein the first crossmember first end extends laterally past the first boom arm such that the total horizontal displacement of the first crossmember first end from the first boom arm is at least 10 cm.

10. The boom of claim 7, wherein the first crossmember first end extends laterally past the first boom arm such that the total horizontal displacement of the first crossmember first end from the first boom arm is between about 35 cm and about 50 cm.

11. The boom of claim 7, wherein the first support member is between about 1 m and about 3 m long.

12. The boom of claim 7, wherein the guard assembly includes a base plate joined to the first crossmember and the first boom arm.

13. The boom of claim 7, wherein the protective layer comprises a foamed polymeric material.

14. A pipelayer configured to transport pipe, the pipelayer comprising:
  a frame including a first boom arm connecting joint;
  a boom arm having distal and proximal ends, the proximal end being pivotally connected to the pipelayer at the first boom arm connecting joint; and
  a pipelayer guard assembly connected to the first boom arm, the pipelayer guard assembly including:
    a first crossmember connected to the first boom arm and having a first end, wherein the first end extends laterally past the first boom arm; and
    a first support member joined proximate to the first end of the first crossmember, the first support member including a support surface and at least one sloping region sloping away from the support surface toward the first boom arm, wherein the first support member is separated from the first boom arm by the first crossmember, the support surface including a protective layer.

15. The pipelayer of claim 14, wherein the guard assembly includes a second crossmember having a first end, and wherein the second crossmember first end extends laterally past the first boom arm.

16. The pipelayer of claim 14, wherein the first crossmember first end extends laterally past the first boom arm such that the total horizontal displacement of the first crossmember first end from the first boom arm is at least 10 cm.

17. The pipelayer of claim 14, wherein the first crossmember first end extends laterally past the first boom arm such that the total horizontal displacement of the first crossmember first end from the first boom arm is between about 35 cm and about 50 cm.

18. The pipelayer of claim 14, wherein the first support member is between about 1 m and about 3 m long.

19. The pipelayer of claim 14, wherein the guard assembly includes a base plate joined to the first crossmember and the first boom arm.

20. The pipelayer of claim 14, wherein the protective layer comprises a foamed polymeric material.

* * * * *